UNITED STATES PATENT OFFICE.

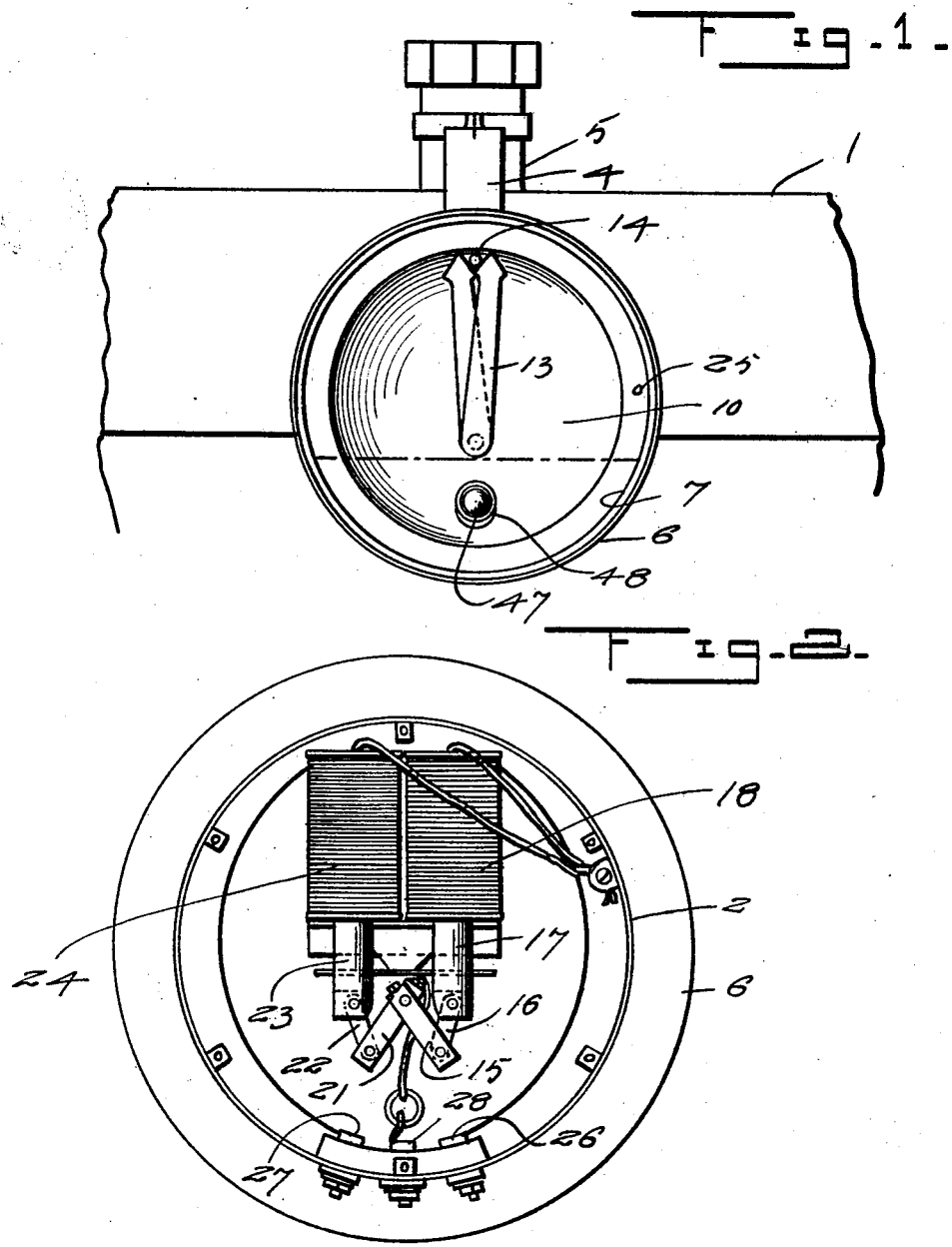

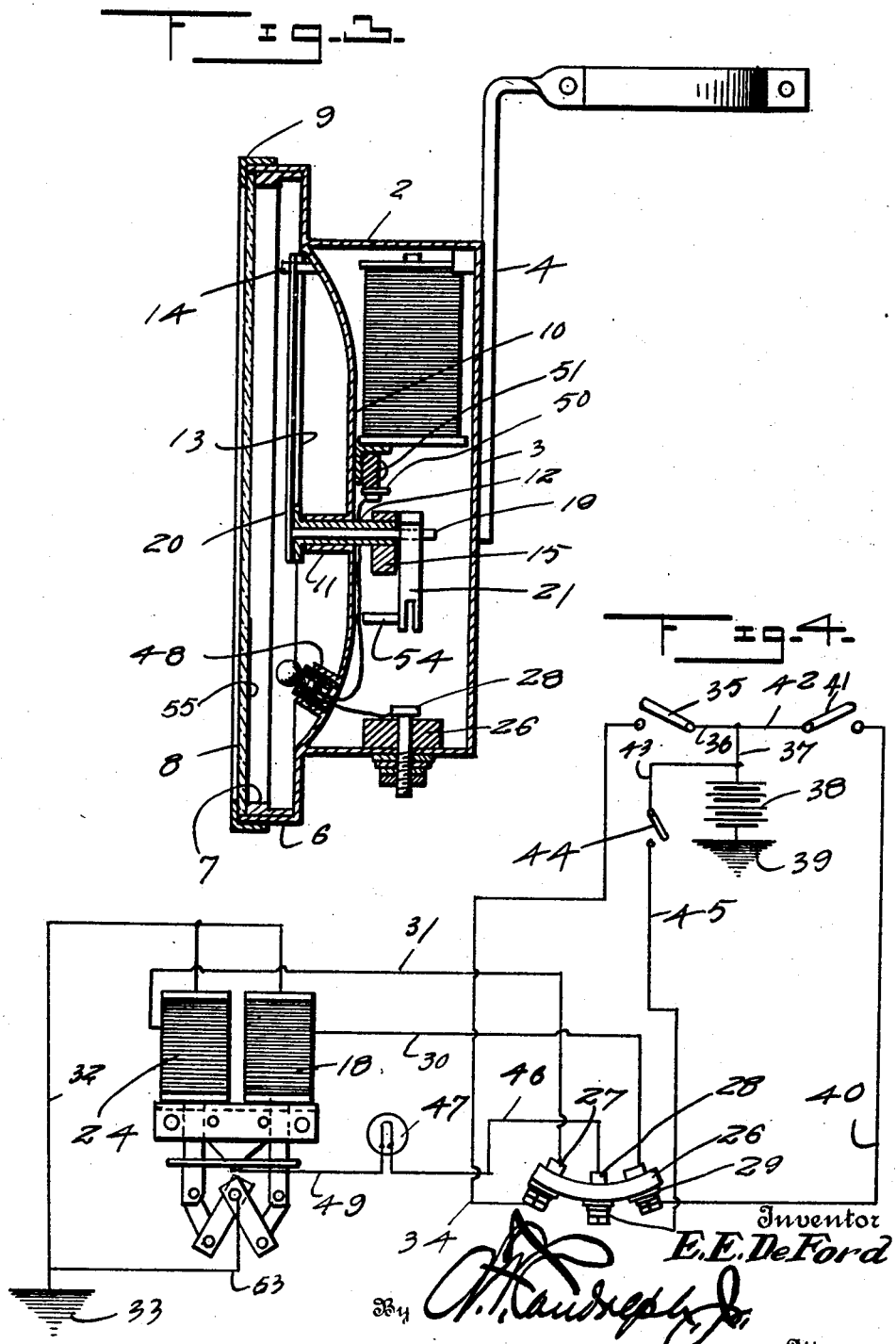

EUGENE E. DE FORD, OF OAKLAND, CALIFORNIA, ASSIGNOR OF FIVE-EIGHTHS TO D. H. MacQUIDDY AND T. S. MacQUIDDY.

AUTOMOBILE-SIGNAL.

1,325,146.  Specification of Letters Patent.  Patented Dec. 16, 1919.

Application filed November 30, 1918. Serial No. 264,797.

*To all whom it may concern:*

Be it known that I, EUGENE E. DE FORD, a citizen of the United States, residing at Oakland, in the county of Alameda and State of California, have invented certain new and useful Improvements in Automobile-Signals; and I do hereby declare the following to be a full, clear, and exact description of the invention, such as will enable others skilled in the art to which it appertains to make and use the same.

This invention relates to improvements in automobile signals and has for one of its objects the provision of electrically operated signaling members located in front or rear or at both ends of an automobile for indicating to traffic in which direction a turn is to be made, or if a stop is contemplated, and which signaling members can be controlled independently of each other or simultaneously by the operator of the automobile.

Another object of this invention is the provision of means whereby the signaling members when moved into signaling position can be illuminated when desired, thus rendering the devices adaptable for night use.

A further object of this invention is the provision of an automobile signal of the above stated character, which shall be simple, durable and efficient, and which may be manufactured and sold at a comparatively low cost.

With these and other objects in view, as will become more apparent as the description proceeds, the invention consists in certain novel features of construction, combination, and arrangement of parts as will be hereinafter more fully described and claimed.

For a complete understanding of my invention, reference is to be had to the following description, and accompanying drawings, in which:—

Figure 1 is a front elevation of an automobile signal construction in accordance with my invention, Fig. 2 is a rear elevation of the same with the rear wall or cover removed, Fig. 3 is a vertical sectional view illustrating the electrical means for moving the signals into signaling position, Fig. 4 is a diagrammatical view of the wiring diagram.

Referring in detail to the drawings, the numeral 1 indicates the radiator of an automobile in which I have elected in this instance to show my invention applied to, but the same may be applied to any other portion of the automobile in front or rear thereof, or may be applied to both ends of an automobile and so connected that both signals will operate in unison.

A cylindrical casing 2, has a rear wall 3 secured thereto and in any well known manner, to which is secured a bracket 4 adapted to clamp about the filling spout 5 of the radiator 1, so that the casing 2 is supported directly in front of the radiator in clear view of the traffic. The front end of the casing 2 is enlarged as illustrated at 6 and has secured therein an annular rim or band 7 adapted to form a stop or abutting engagement with a lens 8. A detachable flange 9 is secured to the enlarged portion 6 and engages the outer face of the lens 8 to hold the same in tight engagement with the band 7. A concaved partition 10 is secured within the casing 2 at a point of the connection of the enlarged portion to the main portion of the casing and has formed thereon a cylindrical bearing 11 in which is journaled a sleeve 12 carrying at one end a signaling member 13 in the form of an arm, having its free end normally disposed vertically and against the stop 14 carried by the partition 10. The other end of the sleeve 12 has secured thereto an arm 15 to which is pivoted a link 16. The link 16 is in turn pivotally connected to the lower end of a core 17 of a solenoid 18 which is secured within the casing 2 vertically so that upon energizing the sloenoid, the core 17 is moved upwardly causing the signaling member 13 to be swung into a horizontal position indicating that a turn to the right is to be made. As soon as the solenoid 18 is deënergized, the core 17 falls by gravity returning the signaling member 13 to a vertical or non-signaling position. A shaft 19 is journaled within the sleeve 12 and carries at its outer end a signaling member 20 similar to the signaling member 13 and which is normally disposed vertically and engages the stop 14 upon an opposite side from that of the signaling member 13. An arm 21 is secured to the other end of the shaft 19 and has pivoted thereto a link 22 which is in turn pivoted to a core 23 slidably mounted within a solenoid 24 located adjacent the solenoid 18 within the casing 2. On energizing the solenoid 24, the core 23 is moved upwardly swinging the signaling member 20 into horizontal or signaling position indicating that a turn to the left is to be made. By energizing both of the solenoids 18 and 24 simultaneously, both of the signaling members 13 and 20 are swung into horizontal or signaling position indicating that a stop is to be made. Oppositely disposed stops 25 are carried by the partition 10 for limiting the movement of the signaling members into signaling position.

An insulating block 26 is secured within the casing 2 and has mounted thereon binding posts 27, 28 and 29 which have their outer ends disposed exteriorly of the casing 2. Conductors 30 and 31 are connected to the inner ends of the posts 27 and 29 and to the solenoids 18 and 24 respectively.

A conductor 32 is connected to both of the solenoids and to a ground 33. A conductor 34 is connected to the outer end of the pole 27 and to the switch 35 which has connected thereto a conductor 36 having connection with a conductor 37 connected to one pole of a battery or other electrical source 38 and which has its other pole connected to a ground 39. A conductor 40 is connected to the outer end of the pole 29 and to a switch 41 that has connected thereto a conductor 42 that is in turn connected to the conductor 37, whereby when closing the switches 35 and 41, an electric circuit will be completed to the solenoids 18 and 24 respectively. A conductor 43 is connected to the conductor 37 and to a switch 44. A conductor 45 is connected to the switch 44 and to the outer end of the pole 28, which has connected to its inner end a conductor 46 that is connected to an electric lamp 47 located within a socket 48 formed within the partition 10 of the casing 2 and located below the signaling members 13 and 20. A conductor 49 is connected to the electric lamp 47 and to a stationary contact 50 carried by an insulating block 51 secured to the casing 2. A conductor 53 is connected to the inner end of the shaft 19 and to the conductor 32 which leads to the ground 33. Contacts 54 are secured to the lower ends of the arms 15 and 21 and are adapted to engage the stationary contact 50 when the cores move upwardly within the solenoids, when said solenoids are energized, thereby completing an electric circuit to the electric lamp 47 when the signaling members move into signaling position. The switch 44 may be opened when the device is being employed in the day time so as to render the electric lamp inoperative when the signaling members move into signaling position. The switches 41 and 35 are preferably located upon the steering mechanism of the automobile in convenient reach of the operator, but any other desired point within the automobile can be selected.

The signaling members 13 and 20, are preferably in the form of arrows and are coated or otherwise covered with a light colored paint or other material so as to make them visible and the partition 10 is preferably coated black so as to make the signaling members stand out. The lower quarter of the lens 8 is preferably coated with quick silver or other similar material 55 to form a mirror, having its reflecting surface disposed inwardly of the casing to reflect the rays of light from the electric lamp upwardly on to the signaling members and the coating material being opaque will hide the direct rays of light from the electric lamp, and also will hide the electric lamp from view.

While I have shown and described the preferred embodiment of my invention, it will be understood that minor changes in construction, combination, and arrangement of parts may be made without departing from the spirit and scope of the invention as claimed.

Having thus described my invention, what I claim is:—

1. An automobile signal comprising a casing, a partition carried by said casing, a sleeve journaled in said partition, a shaft extending through said sleeve, signaling members carried by the sleeve and shaft and normally disposed vertically, arms secured to the shaft and sleeve, links pivoted to said arms, solenoids mounted in said casing, cores slidable in said solenoids and pivoted to the links, and means energizing said solenoids to swing the signals into signaling position.

2. An automobile signal comprising a casing a partition carried by said casing, signaling members pivoted within said casing, an electric lamp carried by said casing, a lens carried by said casing and having a portion thereof coated with deflecting material, arms connected to the signaling members, links connected to said arms, solenoids mounted within said casing, cores slidable in said solenoids and connected to said links, an electrical source, a stationary contact located in said casing, contacts carried by said arms, means electrically connecting the arms and stationary contact with the electric lamp, and means electrically connecting the source with the solenoids to move the signals into signaling position and simultaneously illuminate the electric lamp.

In testimony whereof I affix my signature in presence of two witnesses.

EUGENE E. DE FORD.

Witnesses:
WALTER MONTGOMERY,
B. L. HALVERSON.